United States Patent [19]

Tomida et al.

[11] Patent Number: 4,735,460
[45] Date of Patent: Apr. 5, 1988

[54] WHEEL COVER ATTACHMENT PROVIDING PRE-LOADED BIASSING FORCES

[75] Inventors: Mitsuhiko Tomida; Kazuo Ogawa, both of Nagoya, Japan

[73] Assignee: Sakae Riken Kogyo Co., Ltd., Japan

[21] Appl. No.: 890,535

[22] Filed: Jul. 30, 1986

[30] Foreign Application Priority Data

Mar. 20, 1986 [JP] Japan .................................. 61-63299
Mar. 20, 1986 [JP] Japan .................................. 61-63300

[51] Int. Cl.⁴ ............................................. B60B 7/02
[52] U.S. Cl. .................................. 301/37 P; 301/37 R
[58] Field of Search ................ 301/37 R, 37 P, 37 C, 301/37 CP

[56] References Cited

U.S. PATENT DOCUMENTS 4,232,907 11/1980 Beisch .............................. 301/37 P Primary Examiner—David A. Scherbel
Attorney, Agent, or Firm—Larson and Taylor

[57] ABSTRACT

A wheel cover provided with a pre-loaded spring mechanism wherein a plurality of inner and outer prop-like stopper ribs are arranged integral along the circumferential rim of the wheel cover on the backside thereof, said wheel cover being made of synthetic resin, and a spring which can be expanded wider than the interval between the inner and outer stopper ribs is fitted between the inner and outer stopper ribs, whereby the interval between the inner and outer stopper ribs can be usually kept certain to provide a pre-loaded spring force for fixing the wheel cover to the rim of a disc wheel.

5 Claims, 4 Drawing Sheets

WHEEL COVER ATTACHMENT PROVIDING PRE-LOADED BIASSING FORCES

BACKGROUND OF THE INVENTION

One of the conventional manners of attaching wheel covers made of plastics to the disc wheel rims of the vehicle comprises attaching a wire ring from inside to circular stopper ribs arranged integral along the circumferential rim of the wheel cover on the backside thereof to resiliently urge the circular stopper ribs outward. An example of this approach is disclosed in U.S. Pat. No. 4,027,919 another approach disclosed, e.g., in U.S. Pat. No. 2,746,805, involves inwardly curving a part of such a wire ring to produce a spring force. A further approach proposed by the applicant of the present invention as a Japanese Utility Model Application Sho No. 60-66209 comprises arranging a plurality of outer and inner stopper ribs along the circumferential rim of the wheel cover on the backside thereof and inserting a plate spring between the outer and inner stopper ribs, respectively, wherein the spring pressure of each of the plate springs is adjusted to hold the wheel cover onto the wheel rim.

However, engagement between the wheel covers and rims becomes inferior relatively soon because of deterioration of the plastics of which the stopper ribs on the backside of the wheel covers are made. In addition, the spring pressure of the wire ring and those of the plate springs are likely to become deteriorated. Further, it is difficult to adjust them to have an appropriate spring pressure. Therefore, any successful and satisfactory arrangement has not been proposed yet to attach the wheel covers made of plastics to the wheel rims.

SUMMARY OF THE INVENTION

The present invention relates to a wheel cover made of synthetic resin and, more particularly, it relates to a cover attaching arrangement.

The present invention is intended to usually apply a certain pre-loaded bias force between outer and inner prop-like ribs arranged integral along the circumferential rim of the plastic-made wheel cover on the backside thereof. Namely, a plurality of outer and inner prop-like ribs are arranged integral along the circumferential rim of the wheel cover on the backside thereof and a spring which can be expanded wider than the interval between the outer and inner ribs is fitted between the outer and inner ribs, whereby the interval between the outer and inner ribs is maintained at value no greater than a predetermined value so as to store a portion of the pre-loaded biasing force of the spring acting between the outer and inner ribs.

When the wheel cover is to be attached to the wheel rim, the outer and inner ribs are forcedly and resiliently fitted together with the springs into the hump portion of the wheel rim and when the outer and inner ribs are thus fitted, they are re-sprung together with the springs to generate the necessary retaining forces. When the wheel cover is to be detached from the disc wheel, the wheel cover is removed from the hump portion to again the preloaded biasing force is again provided between the outer and inner ribs.

The first object of the present invention is to provide a wheel cover made of synthetic resin and having a preloaded biassing force generating mechanism and capable of being reliably fixed to the wheel rim.

The second object of the present invention is to provide a wheel cover which can be applied to the wheel rim even when the wheel rim has any dimensional error.

The third object of the present invention is to provide a wheel cover which can be easily attached to and detached from the wheel rim.

The fourth object of the present invention is to provide a wheel cover which can be kept easily detachable over a long time period of use.

The fifth object of the present invention is to provide a wheel cover lower in cost and more reasonable in function.

These and other objects as well as merits of the present invention can be achieved by a wheel cover of the present invention and an example of the wheel cover will be described in detail with reference to the accompanying drawings.

It should be understood that various changes and modification within the spirit of the present invention are covered by claims attached hereto.

DETAILED DESCRIPTION OF THE INVENTION

Figure 1:
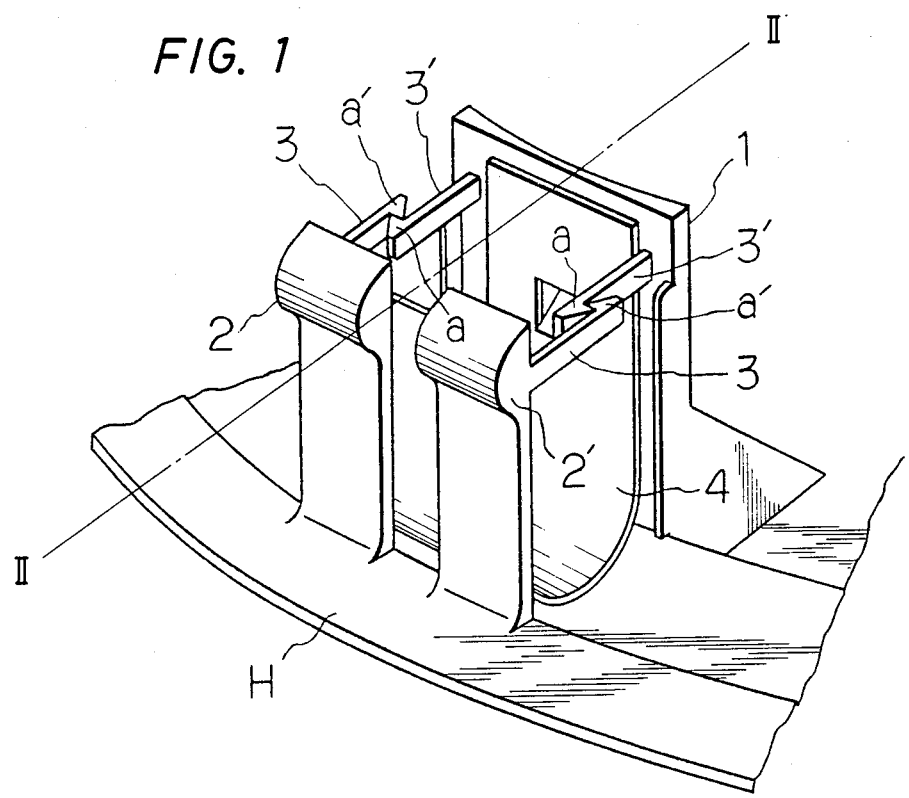
FIG. 1 is a perspective view showing a part of an example of the wheel cover according to the present invention.

As shown in FIG. 1, a plurality of inner and outer prop-like stopper ribs 1 and 2, 2' are formed integral along the circumferential rim of a wheel cover (H) on the back side thereof and arms 3, 3' for interconnecting the inner and outer stopper ribs 1 and 2, 2' are provided between the inner and outer stopper ribs 1 and 2, 2'. The foremost end of each of the arms 3 and 3' is formed to have a hook (a) or (a') and the arms 3 and 3 are engaged with each other at their hooks (a) and (a').

A U-shaped spring 4 is fitted, its opened side up, between the inner and outer stopper ribs 1 and 2, 2'. The interval between the inner and outer stopper ribs 1 and 2, 2' is made smaller than the extent to which the opened side of the spring 4 can be left expanded when it is not fitted between the inner and outer stopper ribs 1 and 2, 2'. And this spring 4 is forcedly fitted between the inner and outer stopper ribs 1 and 2, 2'. Both sides of the thus-fitted spring 4 urge the inner faces of the inner and outer stopper ribs 1 and 2, 2' to lengthen the interval a little between the inner and outer stopper ribs 1 and 2, 2'. The arms 3 and 3' are thus engaged with each other at their hooks (a) and (a') to keep the interval certain between the inner and outer stopper ribs 1 and 2, 2'. A substantial pre-loaded biasing force is thus stored which acts between the inner and outer stopper ribs 1 and 2, 2' to enable the interval between the inner and outer stopper ribs to be shortened when force is applied from outside to the inner and outer stopper ribs 1 and 2, 2' and to restore its original length when the force is removed. The force of the spring which tends to open outward is stopped when the arms 3 and 3' are engaged with each other at their hooks (a) and (a'). Namely, the hooks (a) and (a') stop the inner and outer stopper ribs 1 and 2, 2' from opening outward, thereby keeping the interval between the inner and outer stopper ribs certain.

Figure 2:
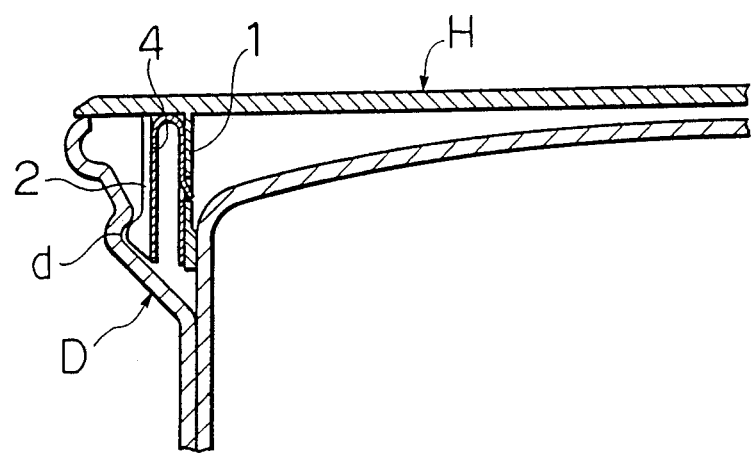
FIG. 2 is a sectional view taken along a line II–II' in FIG. 1 and showing the wheel cover fitted into the wheel rim of the disc wheel.

When the wheel cover (H) is to be fitted into a hump portion (d) along the rim of a disc wheel (D) (see FIG. 2), the outer stopper ribs 2, 2' are forced inward against the spring 4 and after the wheel cover is thus fitted onto the disc wheel (D), the outer stopper ribs 2, 2' are spread into the hump portion (d) to completely fix the wheel cover onto the disc wheel.

When the wheel cover (H) is to be detached from the disc wheel (D), the wheel cover (H) is removed from the hump portion (d) according to the same action as seen in the cover fitting process and the certain pre-loaded biassing force is again maintained between the inner and outer stopper ribs 1 and 2, 2'.

Figure 3A:
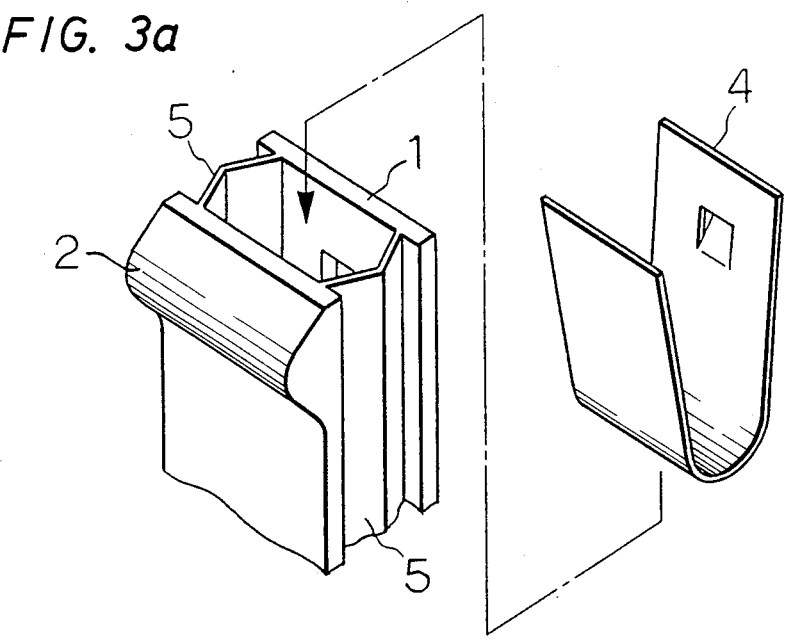
FIGS. 3a and 3b are perspective views showing the main portions of other examples of the wheel cover according to the present invention.
Figure 3B:
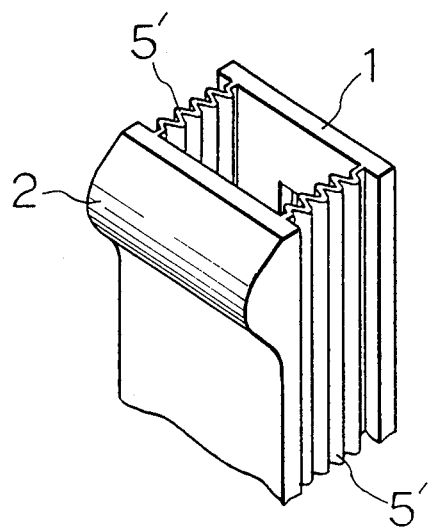

FIG. 3a shows another example of the wheel cover wherein both sides 5 between inner and outer stopper ribs 1 and 2 are of simple bellow type and these bellow-like sides and the inner and outer stopper ribs are made as a single unit. FIG. 3b shows a further example of the wheel cover wherein both sides 5' between inner and outer stopper ribs 1 and 2 are of more complicated bellow type.

When the spring 4 is fitted between the inner and outer stopper ribs 1 and 2 in the case of these examples shown in FIGS. 3a and 3b, the pre-loaded spring force is applied to the inner and outer stopper ribs 1 and 2, as seen in FIG. 1. The U-shaped spring 4 used has a spring width larger than the interval between the inner and outer stopper ribs 1 and 2.

Figure 4A:
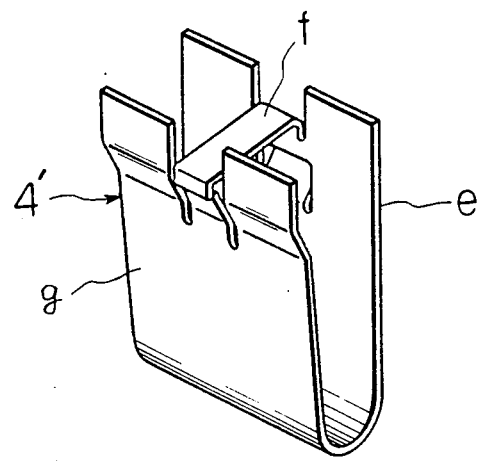
FIG. 4a is a perspective view showing another example of the spring which is used with the wheel cover of the present invention.
Figure 4B:
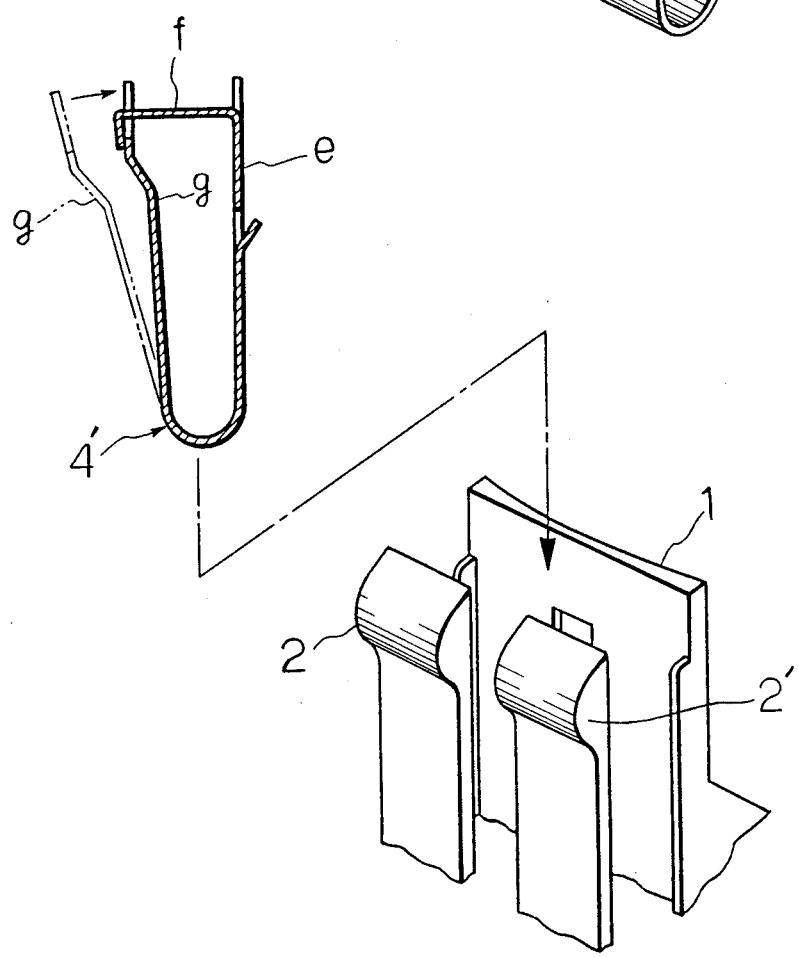
FIG. 4b is a sectional view showing the spring in FIG. 4a arranged between outer and inner ribs.
Figure 5:
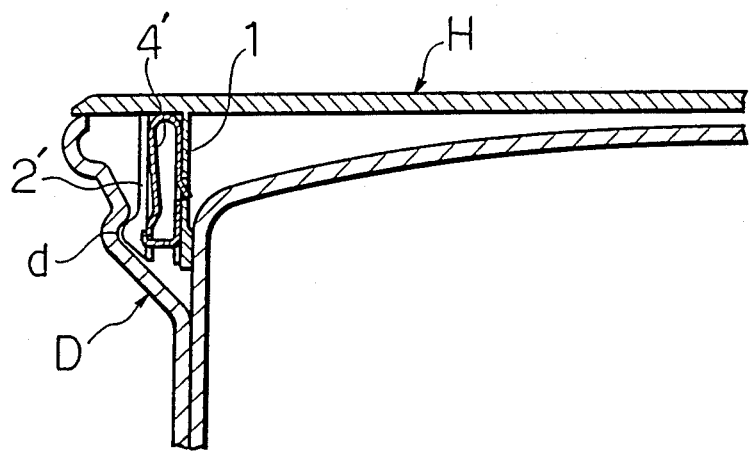
FIG. 5 is a sectional view showing the wheel cover in FIGS. 4a and 4b attached to the disc wheel.

FIGS. 4a and 4b show another spring 4' wherein a projection (f) extends horizontal from the center of a half wing (e) at the upper opened end thereof and the foremost end of the projection (f) is bent downward to engage another half wing (g) of the spring 4'. When the spring 4' is fitted between the inner and outer stopper ribs 1 and 2, 2', as shown in FIG. 4b, the pre-loaded biassing force can be provided between the inner and outer stopper ribs 1 and 2, 2' by the pre-loaded spring force of the compressed spring 4' (see FIG. 5). In this case, however, the arms 3 and 3' shown in FIG. 1 and the bellow-type sides 5 and 5' shown in FIGS. 3a and 3b are not necessarily needed.

When the spring 4' is fitted between the inner and outer stopper ribs 1 and 2, 2', it is kept spread to have a certain spring width and when force is applied from outside to thus-assembled ribs, however, it is forced inward to shorten its spring width and restored again to have the certain spring width when the force is removed. When these springs 4' are fitted between the inner and outer stopper ribs 1 and 2, 2' and the wheel cover (H) is then fitted into the hump portion along the rim of the disc wheel (D) (see FIG. 5), the outer stopper ribs 2 and 2' are forced inward against the springs 4' and they are then spread into the hump portion (d) to completely fix the wheel cover (H) onto the disc wheel (D). When the wheel cover is to be detached from the disc wheel, the outer stopper ribs 2 and 2' are forced inward against the springs 4' and released from the hump portion (d). The pre-loaded force of the spring 4' is again stored or maintained between the inner and outer stopper ribs 1 and 2, 2' by the spring 4' itself.

The springs shown in FIGS. 1 through 3b may be formed as a coiled line spring, a torsion spring or the like.

An additional effect of the present invention is that even when springs each having a small spring constant or force are used, large and reliable force can be obtained by the pre-loaded biassing force providing mechanism of the wheel cover to fix the cover onto the disc wheel.

We claim:

1. A wheel cover provided with a pre-loaded biassing force providing mechanism wherein a plurality of inner and outer prop-like stopper ribs are arranged integral along the circumferential rim of the wheel cover on the backside thereof, said wheel cover being made of synthetic resin, and a spring which can be expanded wider than the interval between the inner and outer stopper ribs such that the interval between the inner and outer stopper ribs is restricted to a predetermined value so as to provide a substantial pre-loaded biassing force for fixing the wheel cover onto a disc wheel.

2. A wheel cover provided with a pre-loaded biassing force providing mechanism according to claim 1 wherein arms for interconnecting the inner and outer stopper ribs are provided between the inner and outer stopper ribs.

3. A wheel cover provided with a pre-loaded biassing force providing mechanism according to claim 1 wherein bellow-like sides are provided between the inner and outer stopper ribs.

4. A wheel cover provided with a pre-loaded biassing force pressure providing mechanism according to claim 1 wherein the spring is a U-shaped plate spring.

5. A wheel cover provided with a pre-loaded biassing force providing mechanism according to claim 1 wherein a U-shaped plate spring having one half wing engaged with a second half wing is fitted between the inner and outer stopper ribs arranged along the circumferential rim of the wheel cover on the backside thereof.

* * * * *